United States Patent
Makowski et al.

[11] 3,821,148
[45] June 28, 1974

[54] PLASTICIZED THERMOPLASTIC BLOCK COPOLYMERS

[75] Inventors: Henry S. Makowski, Scotch Plains; Robert D. Lundberg, Somerville, both of N.J.

[73] Assignee: Esso Research and Engineering Company

[22] Filed: Sept. 28, 1973

[21] Appl. No.: 401,626

[52] U.S. Cl... 260/30.6 R, 260/31.2 R, 260/31.8 R, 260/31.8 Z, 260/31.8 AN, 260/33.6 R, 260/33.6 UA
[51] Int. Cl..... C08f 45/50, C08f 45/38, C08f 45/28
[58] Field of Search...... 260/31.8, 30.6 R, 33.6 UA, 260/886, 896, 33.6 PO

[56] References Cited
UNITED STATES PATENTS

| | | | |
|---|---|---|---|
| 3,231,635 | 1/1966 | Holden et al. | 260/880 |
| 3,355,513 | 11/1967 | Sadron et al. | 260/31.8 R X |
| 3,562,356 | 2/1971 | Nyberg et al. | 260/33.6 UA X |
| 3,761,458 | 9/1973 | Holler et al. | 260/886 X |

*Primary Examiner*—Lewis T. Jacobs
*Attorney, Agent, or Firm*—Robert G. Baran

[57] ABSTRACT

Novel plasticized thermoplastic copolymers are described wherein said copolymer is selected from the group consisting of block copolymers having the general formulae (I)A—B—A, (II)A—B—A—B—A and (III) $xB - [A-B]n - yA$, and graft copolymers having the general formula (IV)

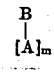

wherein $m$ and $n$ are integers greater than or equal to 2; $x$ and $y$ are 0 or 1, and $y$ is 0 when $n$ is 2; and A and B are mutually incompatible thermoplastic polymer blocks having a solubility parameter difference of greater than 0.7, preferably greater than 1.0, and said plasticizer is selected from the group consisting of plasticizers having a solubility parameter within 1.2 units of the solubility parameter of said B polymer block. Preferably, the A and B polymer blocks have a molecular weight of at least 5000 and a glass transition temperature of at least 35°C., and in general from 25 to 300 parts plasticizer is added per hundred parts of the copolymers described above to prepare the novel compositions claimed herein. The preferred class of copolymers are prepared from vinyl aromatics. In the most preferred embodiment the copolymer is a styrene-t-butyl styrene-styrene copolymer and the plasticizer is an oil having a low aromatics content, for example an oil of about 1-2 percent aromatic content, 10-13 percent paraffinic content and 82-88 percent naphthenic content is preferred. These oils in this general range are widely available as commercial products and generally have a viscosity at 68°F. of about 1100 SSU (Saybolt), and a specific gravity of about 0.88.

27 Claims, No Drawings

PLASTICIZED THERMOPLASTIC BLOCK COPOLYMERS

FIELD OF THE INVENTION

Novel plasticized thermoplastic copolymers are described wherein said copolymer is selected from the group consisting of block copolymers having the general formulae (I)A—B—A, (II)A—B—A—B—A and (III) $X$ B — [A—B]$_n$ — yA, and graft copolymers having the general formula (IV)

wherein $m$ and $n$ are integers greater than or equal to 2; $x$ and $y$ are 0 or 1, and $y$ is 0 when $n$ is 2; and A and B are mutually incompatible thermoplastic polymer blocks having a solubility parameter difference of greater than 0.7, preferably greater than 1.0, and said plasticizer is selected from the group consisting of plasticizers having a solubility parameter within 1.2 units of the solubility parameter of said B polymer block. Preferably, the A and B polymer blocks have a molecular weight of at least 5,000 and a glass transition temperature of at least 35°C., and in general from 25 to 300 parts plasticizer is added per hundred parts of the copolymer described above to prepare the novel compositions claimed herein. The preferred class of copolymers are prepared from vinyl aromatics. In the most preferred embodiment the copolymer is a styrene-t-butyl styrene-styrene copolymer and the plasticizer is an oil having a low aromatics content, for example an oil of about 1–2 percent aromatic content, 10–13 percent paraffinic content and 82–88 percent naphthenic content is preferred. These oils in this general range are widely available as commercial products and generally have a viscosity at 68°F. of about 1100 SSU (Saybolt), and a specific gravity about 0.88.

BACKGROUND OF THE PRIOR ART

French Patent No. 1,576,598 teaches the specific plasticization of copolymers. More specifically, the French patent teaches that two-block, three-block, graft and and statistical copolymers, wherein the polymer blocks which make up the copolymer are present in separate distinct microphases, may be converted into novel compositions by the addition of a plasticizer which specifically plasticizes only one of the polymer blocks. The French patent teaches the equivalency of the above-described copolymer types and that either polymer block may be elastomeric.

The present invention differs from this patent in that all two block copolymers, all statistical or random copolymers, all three block copolymers wherein the terminal blocks are plasticized, and all block copolymers wherein one of the polymer blocks is elastomeric are specifically excluded from our invention.

Furthermore the instant invention teaches a criticality in the amount of plasticizable block (B-block) which must be present in the block copolymer.

Finally the present invention describes the critical values of solubility parameter which must obtain for proper phase separation to occur with suitable block copolymers of this invention. According to French Pat. No. 1,576,598 acceptable and preferred copolymers are the block copolymers polystyrene-polymethylmethacrylate and polystyrene-polyvinylchloride. The solubility parameters in the former system are 9.1 and 9.5 for the polystyrene and polymethylmethacrylate blocks, respectively. In the latter system, the solubility parameters are 9.1 and 9.4 for the polystyrene and polyvinylchloride blocks, respectively. The solubility parameter differences in these block copolymers do not fall within the critical constraints of the present invention.

As a result of this difference in solubility parameters of the individual copolymeric blocks the present invention differs dramatically from that practiced in the prior art. For example, in the present invention it is feasible to add as much as 200 parts of plasticizer per 100 parts of copolymer and still obtain products with good tensile properties.

Even more important the critical distinction of solubility parameter of our invention makes it possible to selectively plasticize one phase while not destroying the other. The proof of this critical and surprising finding is demonstrated in the examples of the present invention where plasticized products having the very high and recoverable elongations at break of 150 to 500 percent are routinely obtained. It is to be emphasized that the prior art demonstrates no similar behavior. French Pat. No. 1,576,598 achieves only low elongations, normally from 5 to 80 percent and only in one case an elongation as high as 110 percent. Thus, the products described herein are the first examples of plasticized, phase separated block copolymers which provide a combination of good strength and elastomeric (i.e., greater than 150 percent elongation at break) behavior.

This finding is of major scientific and technological importance. The combination of plasticizers with polystyrene or styrene copolymers has long been known. The resultant products at plasticizer levels of 25 to 100 parts of plasticizer (such as dibutyl phthalate) exhibit low softening points, irrecoverable flow under stress, low tensile strength, and moderate or high elongations depending on plasticizer. French Pat. No. 1,576,598 provides no substantial improvement over that prior art.

The examples described in French Pat. No. 1,576,598 clearly show a catastrophic decrease in softening point (and, therefore, in use temperature) of the cited copolymers as increasing amounts of plasticizer are added. This behavior is clearly a manifestation of the indiscriminate attack of plasticizer on both phases of the block copolymers employed.

SUMMARY OF THE INVENTION

Novel plasticized thermoplastic copolymers are disclosed wherein said copolymer is selected from the group consisting of block copolymers having the general formulae (I) A—B—A; (II) A—B—A—B—A; (III) $x$B — (A—B)$_n$ —yA; and graft copolymers having the general formula

wherein $n$ and $m$ are integers greater than or equal to 2; and $x$ and $y$ are 0 or 1, and $y$ is 0 when $n$ is 2; and A and B are mutually incompatible thermoplastic polymer segments. The incompatible phases which result from such block systems are substantially amorphous glasses, i.e., phases containing less than 5 percent crystallinity. Block copolymers according to Formula III which contain one or even two end blocks composed of B-segments are operable within this invention provided the end block B-segments do not exceed 35 percent by weight of the total amount of B-segments present in the copolymer. Thus, for example, $aA-bB-aA-bB-aA-bB$ and $bB-(aA-bB)_5$ where $\Sigma a + \Sigma b = 100$ are operable even though they contain one and two end B-blocks, respectively. In any case, however, the most preferred block copolymers are those devoid of any end B-blocks. In the compositions of the instant invention m and n are preferably less than 100, more preferably less than 25.

The thermoplastic polymer blocks each have a softening point of at least 35°C., and more preferably at least 50°C. The individual polymer blocks are chosen so that their solubility parameter difference will be greater than 0.70, and preferably greater than 1.0. The plasticizers chosen for these block copolymer systems are relatively non-volatile liquids which preferentially solvate the B-block of the block copolymer, i.e., which possess solubility parameters similar to that of the B-block.

Solubility parameter is a term which has been widely employed to characterize quantitatively the polar characteristics of liquids and polymers. Small (*J. App. Chem.*, 3, 71 (1953)) first employed this approach quantitatively to ascertain the solvent power of certain diluents for selected polymers and demonstrated the predictive capability of this tool. A rather complete list of solubility parameters for various liquids and polymers is found in the Polymer Handbook, Edited by Brandrup and Immergut, Wiley & Sons, 1966, p. IV — 341 to IV — 368. A summary of the utility of solubility parameters is also provided therein. It is also described how the solubility parameter can be calculated for those polymers and liquids for which values have not yet been determined.

All solubility parameter values cited hereinafter, whether determined experimentally or calculated, apply at 25°C.

With the information now available in the literature it is feasible to determine solubility parameters for nearly any polymer block which can be prepared. We have observed that in the case of block and graft copolymers, it is essential that the solubility parameters of the blocks be sufficiently different (at least 0.70 units and preferably greater than 1.0 units) in order to effect phase separation of the polymer blocks.

Thus, this invention teaches this critical difference in solubility parameter for the products to have any merit. There is no upper limit to this difference in solubility parameter for the various polymer phases, however, practically one does not normally encounter polymer blocks which possess a solubility parameter difference of more than 4 or 5 units. Indeed, if the difference in solubility parameter between two polymer blocks is greater than 5 units, one finds that the polymer blocks are so incompatible it may be difficult to create the block copolymers using the preparative chemistry discussed herein.

The criteria above clearly delineate what polymer blocks can be combined to create an acceptable phase separated block or graft copolymer. There is an additional requirement that the selective plasticizer for the B block must also possess the requisite solubility parameter value. Ideally the selective plasticizer should have a solubility parameter reasonably close to that of the B block. However, it is often desirable for reasons of economics, or for particularly desirable physical properties to employ a selective plasticizer which has a solubility parameter distinctly different from that of the B block ($\delta_B$). We have found that if a selective plasticizer is employed which possesses a solubility parameter ($\delta_p$) which is too close to that of the A block ($\delta_A$) then that A block is solubilized with a substantial loss in physical properties for the resultant product. However, plasticizers with solubility parameters different from that of the B-block can be used providing they fall within the following constraints: (1) $\delta_p$ cannot be closer to $\delta_A$ than to $\delta B$; (2) $\delta_p$ should not differ from $\delta_B$ by more than 1.2 units, preferably no more than 0.9 units.

There are occasions where certain plasticizers may seem operable outside of the above-cited ranges. However, if the plasticized system is conditioned at ambient temperature or at elevated temperatures for prolonged periods of time, those plasticizers which are outside the above constraints will bleed or exude from the copolymers and adversely affect the physical properties of said systems. This will be especially pronounced at higher levels of such undesirable plasticizers.

Plasticizers which are more closely compatible with the B block will have less of a solvating effect on the A block. This becomes especially important if the A block and B block are less than 1.0 unit apart in solubility parameter. We can provide some examples of systems which are acceptable under these criteria and also unacceptable.

For example consider the block copolymer wherein polystyrene ($\delta_A = 9.1$) is the A block and poly-t-butyl styrene ($\delta_B = 8.1$) is the B block. Di-n-hexyl phthalate ($\delta_p = 8.9$) would not be an acceptable plasticizer. Diisodecyl phthalate ($\delta_p = 7.2$) would be acceptable.

It is apparent that a rapid means of determining $\delta_p$ of an appropriate plasticizer is desired. For many common non-volatile liquids these values are available in the *Polymer Handbook* (loc. cit). For certain oils which are highly valued in this invention for their excellent volatility, water resistance, and good economics, values of $\delta_p$ are not readily available. In this case the values of $\delta_p$ can be determined from the empirical formula $\delta = 4.1 (\gamma/V \frac{1}{3}) 0.43$ where V = molar volume of the plasticizer and $\gamma$ is the surface tension in dynes per centimeter. In this invention we will employ this approach to ascertain the $\delta$ of certain oils as plasticizers.

The thermoplastic blocks which comprise the block copolymers of this invention may be chosen with reference to any known table on solubility parameters for polymers.

Representative examples of copolymers which are suitable for use in the instant invention provided they fall within the above-defined general formulae are: poly-t-butylstyrene-polystyrene, polychlorostyrene-polystyrene, polyvinyltoluene-poly-t-butylstyrene, poly-α-methyl-styrene-poly-t-butylstyrene, polyacrylonitrile-polystyrene, polymethacrylonitrile-polystyrene, polyacrylonitrile-poly-α-methylstyrene, bisphenol A polycarbonate-polystyrene, bisphenol A polycarbonate-poly-t-butylstyrene, polyphenylhydroxyether of bisphenol A-polysulfone (from bisphenol A and dichlorodiphenyl sulfone), polymethacrylonitrile-poly-t-butyl styrene, polymethylmethacrylate-poly-t-butylstyrene, polyacrylonitrile-polyvinylacetate, poly-t-butyl styrene-polyvinylacetate, etc.

Preferable copolymers include: poly-t-butyl styrene-polystyrene, polymethacrylonitrile-poly-t-butylstyrene, and polyacrylonitrile-polystyrene of the A—B—A type. For reasons of economics and general utility those multiphase thermoplastics which incorporate aromatic polymer blocks (especially polystyrene) are most preferred. Those systems involving polystyrene blocks can be employed with a wide range of nonvolatile plasticizers ideally suited to this invention. Alternatively, polymer blocks based on poly-t-butylstyrene are desirable because these polymer blocks are readily solvated by nonvolatile, inexpensive oils of an aliphatic composition. The availability and low cost of these oils, therefore, can provide plasticized systems of good properties and low cost. Each of these polymer blocks based on different aromatic monomers (for example, styrene and t-butyl styrene) will be solvated by different types of plasticizers and provide greatly different properties suitable for different applications.

The polymer blocks of the instant invention will individually have a molecular weight of at least 5,000, preferably from 5,000 to 500,000, and most preferably from 10,000 to 250,000. In general, the A and B blocks may be combined in all weight ratios. However, preferably the B block will comprise from 30 to 95 weight percent of said thermoplastic block copolymer. The most preferred thermoplastic block copolymer types used in the instant invention may be represented by the general formula A—B—A wherein A and B are as defined above. In this preferred copolymer the B block will comprise from 45 to 90 weight % of said total copolymer, more preferably from 50 to 80 weight %.

The plasticizer which will be used in preparing the novel compositions of the intant invention may also be selected with reference to any table on solubility parameters. Some specific examples are diisodecylphthalate (7.2); dioctylphthalate (7.9); ethylbenzoate (8.2); tricresyl phosphate (8.4); dioctyl sebacate (8.6); dioctyl adipate (8.7); di-n-hexyl phthalate (8.9); dibutyl sebacate (9.2); dibutylphthalate (9.3); diethylphthalate (10.0); dipropylphthalate (9.7); white oils having a specific gravity of 0.885 and an aromatic/paraffinic/naphthenic volume percent of about 1.0/13/86 % (7.3). The plasticizer may be added to the thermoplastic block copolymer by techniques which are known to the skilled artisan, for example, the plasticizer may be milled with said thermoplastic block copolymer or the thermoplastic block copolymer and the plasticizer may be dissolved in a suitable solvent, and the solvent evaporated. In general, the thermoplastic block copolymer of the instant invention may be compounded with from 25 to 300 parts per hundred plasticizer, more preferably from 40 to 200.

The preferred thermoplastic block copolymers utilized in preparing the novel compositions of the instant invention are vinyl aromatics. Monomers which are useful for preparing said vinyl aromatic polymer blocks include styrene, t-butyl styrene, p-vinyltoluene, and αmethyl styrene. By use of vinylaromatic polymeric blocks, compositions loaded with high amounts of plasticizer and having good polymer properties may be prepared. For example, hydrocarbon oil type plasticizers may be conveniently used with block copolymers wherein styrene comprises the A block and t-butyl styrene comprises the B block. These systems are novel oil-extended plastics and retain properties which are equivalent to more expensive materials while being characterized as being more economical. Oil extended styrene-t-butyl styrene-styrene block copolymers, may be formulated wherein the hydrocarbon oil content will comprise up to 70 percent by weight of said total composition. As further described below, compositions of this sort will still retain good polymer toughness, i.e., elongation plus tensile strength.

Plasticizers which can be used in this invention, especially with t-butyl styrene block copolymers, are low molecular weight polymeric oils such as polypropylene, polybutene, ethylene-propylene copolymers such as squalane and other synthetic ethylene-propylene copolymers, polybutadiene, polyisoprene, etc. Although these materials can be excellent plasticizers it is difficult to predict their compatibilities with different polymer blocks since compatibility of these oils is a function not only of composition but also of molecular weight. Solubility parameters determined for higher molecular weight species or solubility parameters calculated from the molar attraction constants of functional groups may therefore not be accurate. In this event plasticizers for multiphase copolymers described above containing polymer blocks A and B may be readily selected by the following simple test. One gram of homopolymer A and homopolymer B are each combined with 100 grams of the prospective plasticizer and each heated to a temperature near or above the softening point of the homopolymer and then cooled to room temperature. If homopolymer B dissolves under these conditions and homopolymer A does not, the liquid medium will make an acceptable plasticizer for the system.

The poly-alpha-olefins, ethylene-alpha-olefin copolymers, and polydienes which are useful plasticizers in this invention possess molecular weights of 3,000 or under, preferably of 1,500 or under, and viscosities at 25°C. of 50 stokes or less, preferably 30 stokes or less.

Examples of suitable plasticizers for a polystyrene block are: dibutyl phthalate, dihexyl phthalate, tributyl phosphate, etc. Suitable plasticizers for a poly(-t-butyl styrene) block are: squalane, low molecular weight polymers of propylene, butadiene or isoprene, paraffinic based oils, didecyl phthalate, ditridecylphthalate, etc. Suitable plasticizers for a block polymer of polyphenylhydroxy ether of bisphenol A are diethyl phthalate, dibutyl phthalate, and low molecular weight condensation polyesters of 1,4-butane diol and adipic acid or 1,6-hexane diol and adipic acid, said polyesters being liquid and having viscosities at room temperature of 500 to 50,000 centipoises. Suitable plasticizers for a polyvinyl acetate block are diethyl phthalate, dibutyl phthalate, dihexyl phthalate, tributyl phosphate, etc.

White oils useful in this invention for plasticization of poly-t-butyl styrene are commercially available oils possessing very low aromatics content generally on the order of 1 volume % or less. They can be characterized as having the composition of from about 10 to 50 or more volume percent paraffinic content, the balance being naphthenic hydrocarbon. The average molecular weights of these oils (as measured by vapor pressure osmometry) range from about 250 to about 550. The specific gravity (15.6°C./15.6°C.—ASTM D-287) can range from about 0.83 to about 0.90. The Saybolt viscosity (as measured by ASTM D-446) measured at 37.8°C. can vary from about 50 SSU to about 500 SSU.

Other oils suitable for plasticization of the poly-t-butyl styrene blocks of this invention are commercially available process oils possessing an aromatic content of from 1 to 50 volume percent, the remainder being paraffinic or a mixture of paraffinic naphthenic hydrocarbons. Oils suitable for use in this invention range in specific gravity (15.6°C./15.6°C.) from 0.85 to 0.95 and possess a Saybolt viscosity (37.8°C.) range of from 100 SSU to about 6,500 SSU. The molecular weight range of these oils is from about 250 to about 600 as measured by vapor pressure osmometry.

The thermoplastic block copolymers of the instant invention may be prepared by either of two well-known polymerization techniques: (1) the preparation of terminally functional polymers followed by condensation reactions, or (2) addition polymerization during which one monomer is added and completely polymerized and then another added until the desired number of blocks are obtained. In the case of the terminally functional polymers preparative techniques for these polymer blocks are well known (see, for example, *Preparative Techniques of Polymer Chemistry*, Sorenson and Campbell, Interscience Publishers, 1968), and the means of combining these various blocks with each other is now well known in the polymer art. The condensation of terminally functional polymers results in block copolymers generally described by Formula III.

The A—B—A and A—B—A—B—A block copolymers are desirable copolymers which can be prepared through strict addition polymerization involving anionic initiators. The anionic initiators can be monofunctional, such as butyllithium, in which case multi-block copolymers can be prepared by either of two methods: (1) addition and complete polymerization alternately of A monomers and B monomers until the desired number of blocks have been obtained, and (2) preparation of one-half of the copolymer molecule by addition polymerization followed by coupling of the reactive carbon-metal chain ends with reagents such as chlorosilanes, ethylene dibromide, 1,4-bis-chloromethyl-benzene, dimethyl terephthalate, and the like. Difunctional initiators, such as those derived from sodium or lithium naphthalene, can be used in which case the middle blocks are polymerized first and the end blocks, polymerized last.

Preferably A—B—A and A—B—A—B—A block copolymers are prepared so that they are substantially free of either homopolymer, A or B, and A—B diblocks. The presence of homopolymer A is least harmful and up to about 30 percent by weight can be tolerated. Homopolymer B functions much as a diluent, and up to 20 percent by weight can be tolerated to produce systems with good physical properties. The presence of A—B diblocks is most deleterious and, for plasticization to result in good properties, the amount of A—B diblock cannot exceed 10 percent by weight.

In all cases, the total amount of homopolymer, and diblock impurities is most preferably less than 10 weight %.

In the instant invention it is particularly important to choose a plasticizer which will not solvate the end blocks. For example, only the middle block should be solvated by the plasticizer. Thus, a copolymer of the B—A—B type wherein a plasticizer which will solvate the B block is utilized will not yield the novel properties of the compositions of the instant invention. Furthermore, two block thermoplastic copolymers of the A—B type wherein either block is plasticized and the other substantially unaffected will also not give the desired properties. More particularly, in both of these instances plasticization at any ressonable level does not result in a polymer system having adequate tensile strength or elongation. Furthermore, we specifically exclude random or statistical copolymers from this invention because they do not provide the phase separated products which we require.

It is to be noted that we have generally required block or graft copolymers wherein the B block comprises at least 30 percent of the total polymer and most preferably 50 percent. The reason for this is that when the B block is plasticized the resulting plasticized phase should constitute the continuous phase. This will generally occur provided the B block plus plasticizer constitutes the major portion of the block polymer plus plasticizer. If the B block constitutes only 25 percent of the polymer and a relatively low level of plasticizer is added (say 25 parts per 100 of polymer) then the total of B block and plasticizer will only constitute 50 parts of the total of 125 parts of product. Under these circumstances, the B block and plasticizer normally will not constitute the continuous phase and a brittle product will result.

When prepared according to the teachings of this invention, flexible high strength plastics result. These plasticized compositions are very useful for making extruded clear film with good low temperature properties and excellent resistance to plasticizer extraction by water. Hose and tubing extruded from these materials have an excellent assemblage of physical properties. When calendared on a suitable fabric base, a flexible product similar to leather is obtained which can be embossed or printed for decorative purposes. Thus, these products are useful in many applications including injection molded items.

The following are specific embodiments of the instant invention. There is, however, no intent to be bound by the examples described below.

EXAMPLE 1

A triblock copolymer of styrene and t-butyl styrene (TBS) was prepared as follows: 1000 ml of benzene and 1.04 meq. of n-butyllithium were charged to a reactor and 29.3 g (0.281 mole) styrene added. The solution was stirred at 20°C. for 30 minutes and 141.5 g. (0.883 mole) t-butyl styrene added. The solution was stirred for 30 minutes at 14°C. and finally 29.4 g (0.282 mole) styrene was added. The solution was stirred for 30 minutes at 20°C., and the polymerization was terminated with methoanol. The block copolymer was precipitated with methanol in a Waring blendor. The copolymer was dried in a vacuum oven at 80°C. Yield = 199 g. Composition of block copolymer: 14.6 wt. % styrene-70.7 wt. %, t-butyl styrene 14.7 wt. % styrene. Overall degree of polymerization of the block copolymer is greater than 1385. The copolymer has a styrene-TBS-styrene sequence.

This block copolymer was rigid and brittle. Gel permeation chromatography (GPC) of the block copolymer showed it to be substantially all 3-block and to have a narrow molecular weight distribution. The copolymer was transparent but exhibited two separate glass transition temperatures at 377°K and 420°K corresponding to the glass transition temperatures of polystyrene and poly-t-butylstyrene.

The block copolymer was plasticized as follows: Benzene, containing 1 g per liter of di-tert-butyl catechol inhibitor, was used to make up solutions of 20 parts by weigh copolymer and 80 parts by volume of benzene. The desired amount of plasticizer was added and the entire solution was then evaporated in a shallow pan in a vacuum oven at 80°C. The plasticized copolymer was then further mixed on a rubber mill at 335°F. for 5 minutes. Films of 20 mils thickness were compressed molded and stress-strain properties obtained.

Two separate plasticizers, Primol D and Flexon 845 were used with the following results:

Primol D[a]

| Parts Oil/100 Parts Copolymer | Tensile Strength, psi | Elongation, % |
|---|---|---|
| 20 | Brittle | — |
| 40 | 1681 | 50 |
| 60 | 1465 | 293 |
| 80 | 1047 | 410 |
| 100 | 554 | 448 |
| 120 | 465 | 493 |
| 140 | 410 | 500 |
| 160 | 265 | 493 |
| 180 | 291 | 488 |
| 200 | 58 | 335 |

[a]Primol D is a white oil having an average molecular weight of about 500 (vapor pressure osmometry) based on paraffinic and naphthenic hydrocarbons with a specific gravity at 15.6°C. of 0.885, and with a kinematic viscosity measured at 20°C. of 240 centistokes, and a refractive index at 20°C. of 1.4823.

Flexon 845[b]

| Parts Oil/100 Parts Copolymer | Tensile Strength, psi | Elongation, % |
|---|---|---|
| 20 | 1190 | 110 |
| 40 | 1200 | 360 |
| 60 | 1030 | 403 |
| 80 | 763 | 475 |
| 100 | 513 | 530 |
| 120 | 403 | 550 |
| 140 | 368 | 540 |
| 160 | 141 | 490 |
| 180 | 122 | 460 |
| 200 | 113 | 453 |

[b]Flexon 845 is an oil consisting of about 15% aromatics and about 84% saturates, and possessing a refractive index at 20°C. of 1.4755, a specific gravity at 60°F. of 0.8649, and a viscosity at 100°F. of 31.9 centistokes.

As can be seen from the elongation data, the plasticizers markedly increased flexibility. At low levels the plasticized copolymer was stiff and leathery. At very high levels the plasticized copolymer was snappy and rubbery. While the plasticizer markedly improved flexibility the resultant materials still maintained a high level of strength even up to 180 parts of plasticizer. All the materials obtained were clear and transparent.

It is to be emphasized that this experiment is operable in the sense of giving clear, flexible and very desirable plasticized products even at high levels of plasticizer. The following Table provides some information on the solubility parameters of the respective polymer blocks and plasticizers:

Solubility Parameters of PS, PTBS and Oil

| Polymer of Plasticizer | Solubility Parameter | Source |
|---|---|---|
| Polystyrene | 9.1 | Polymer Handbook p.IV-366 |
| Poly-t-butylstyrene | 8.1 | Calculated |
| Primol D Oil | 7.3 | Calculated |
| Flexon 845 | Estimated 7.5 ± .5 | Estimated |

It is apparent that polystyrene and poly-t-butylstyrene, despite their apparent structural similarity are sufficiently different in solubility parameter to meet our criteria. Indeed they are phases separated as shown by two softening points. The use of Primol D oil as a plasticizer also meets our criteria and the result is an excellent assemblage of physical properties.

EXAMPLE 2

According to the procedures described in Example 1, a styrene-TBS-styrene block copolymer was prepared having the composition 24.7 wt. % styrene-50.4 wt. % TBS-24.9 wt. % styrene. The copolymer had an overall degree of polymerization of at least 1400.

This copolymer also was hard and brittle. GPC showed it to be essentially 3-block and to possess a narrow molecular weight distribution. The copolymer was transparent but possessed two separate glass transition temperatures corresponding to the glass transition temperatures of polystyrene and poly-t-butylstyrene.

According to the procedures described in Example 1, the copolymer was plasticized with different levels of Primol D and Flexon 845 with the following results:

Primol D

| Parts Oil/100 Parts Copolymer | Tensile Strength, psi | Elongation, % |
|---|---|---|
| 20 | Brittle | — |
| 40 | 1624 | 72 |
| 60 | 1577 | 230 |
| 80 | 1142 | 285 |
| 100 | 801 | 210 |
| 120 | 842 | 330 |
| 140 | 670 | 340 |
| 160 | 603 | 322 |
| 180 | 540 | 332 |
| 200 | 480 | 330 |

Flexon 845

| Parts Oil/100 Parts Copolymer | Tensile Strength, psi | Elongation, % |
|---|---|---|
| 20 | Brittle | — |
| 40 | 1226 | 127 |
| 60 | 1362 | 245 |
| 80 | 1024 | 263 |
| 100 | 750 | 235 |
| 120 | 657 | 260 |
| 140 | Oil Exudes | — |
| 160 | do. | — |
| 180 | do. | — |
| 200 | do. | — |

Except for the samples where exudation occurred, the plasticized materials were clear and transparent. The data show that high strength flexible plasticized materials can be prepared with a styrene-TBS-styrene block copolymer where the TBS comprises 50 wt. % of the copolymer. With Primol D even at 200 parts plasticizer the plasticized copolymer meaintains high strength and high elongation.

This experiment also demonstrates clearly that when the center block (i.e., the block to be plasticized) comprises about 50 percent of the polymer, then the capacity of that block to accept large amounts of plasticizer is reduced as compared to a similar system in Example 1 where the center block comprised about 70 percent of the polymer. Example 4 provides an additional example where only 30 percent of the plasticizable center block is present, and in that case plasticizer exudation is observed at all plasticizer levels above 100 parts per 100 parts of copolymer. Thus, it is clear that the compatibility of the plasticizer is dependent not only on the structures (or solubility parameters) of the plasticizer and the polymer block B but also on the composition of the block copolymer. For those materials where plasticization with large amounts of plasticizer (100 to 300 parts) is contemplated it is apparent that the B block should comprise 50 percent or greater of the total weight percent of the polymer.

EXAMPLE 3

The block copolymer of this example was prepared according to procedures given in Example 1. As in Example 2, it also was composed of 50 wt. % TBS, but in this example the block order was reversed, i.e., a TBS-styrene-TBS block copolymer was prepared with the following composition: 25 wt. % TBS-50 wt. % styrene-25 wt. % TBS. The copolymer had an overall degree of polymerization of at least 1396.

This copolymer was hard and brittle. GPC showed it to be substantially 3-block and to possess a narrow molecular weight distribution. The copolymer was transparent but possessed two separate glass transition temperatures corresponding to polystyrene and poly-t-butyl styrene.

According to the procedures in Example 1, the copolymer was plasticized with different levels of Primol D and Flexon 845 with the following results:

Primol D

| Parts Oil/100 Parts Copolymer | Tensile Strength, psi | Elongation, % |
|---|---|---|
| 20 | Brittle | — |
| 40 | Brittle | — |
| 60 | 1363 | 5 |
| 80 | 539 | 10 |
| 100 | 140 | 120 |
| 120 | Tacky, no strength | — |
| 140 | do. | — |
| 160 | do. | — |
| 180 | do. | — |
| 200 | do. | — |

Flexon 845

| Parts Oil/100 Parts Copolymer | Tensile Strength, psi | Elongation, % |
|---|---|---|
| 20 | Brittle | — |
| 40 | 1242 | 10 |
| 60 | 582 | 95 |
| 80 | 181 | 140 |
| 100 | 109 | 110 |
| 120 | Tacky, no strength | — |
| 140 | do. | — |
| 160 | do. | — |
| 180 | do | — |
| 200 | do. | — |

This example also shows the selective plasticization of the TBS blocks. However, the data show that when the TBS blocks are at the end of the 3-block copolymer very poor properties of the plasticized copolymer are realized. Thus, it is illustrated that to obtain good properties with a plasticized ABA copolymer the block that is being selectively plasticized must be in the middle.

EXAMPLE 4

According to the procedures described in Example 1, a styrene-TBS-styrene block copolymer was prepared having the composition 35 wt. % styrene-30 wt. % TBS-35 wt. % styrene. The copolymer had an overall degree of polymerization of at least 1401.

The copolymer was hard and brittle. GPC showed it to be essentially a 3-block and to possess a narrow molecular weight distribution. The copolymer was transparent but possessed two separate glass transitions corresponding to polystyrene and poly-t-butylstyrene.

According to the procedures described in Example 1, the copolymer was plasticized with different levels of Primol D and Flexon 845 with the following results:

Primol D

| Parts Oil/100 Parts Copolymer | Tensile Strength, psi | Elongation, % |
|---|---|---|
| 20 | Brittle | — |
| 40 | 1692 | 72 |
| 60 | 1453 | 95 |
| 80 | 1208 | 170 |
| 100 | 1100 | 190 |
| 120 | Exudes | — |
| 140 | do. | — |
| 160 | do. | — |
| 180 | do. | — |
| 200 | do. | — |

Flexon 845

| Parts Oil/100 Parts Copolymer | Tensile Strength, psi | Elongation, % |
|---|---|---|
| 20 | Brittle | — |
| 40 | 1534 | 90 |
| 60 | 1274 | 117 |
| 80 | 1111 | 180 |
| 100 | 999 | 228 |
| 120 | Exudes | — |
| 140 | do. | — |
| 160 | do. | — |
| 180 | do. | — |
| 200 | do. | — |

These data show that S-TBS-S block copolymers containing only 30 wt. % TBS can be effectively plasticized at oil levels of 60–100 parts. However, higher levels of oil cannot be introduced. Thus, from these data it is clear that in order to introduce high levels of oil the wt. % of middle block should be as high as possible.

EXAMPLE 5

A homopolymer of t-butyl styrene was prepared according to the general procedures described in Example 1. The homopolymer had a degree of polymerization of at least 1397.

This homopolymer was also plasticized with various levels of Primol D and Flexon 845. At 20 parts the plasticized materials were brittle. At 40 parts the materials were flexible to some extent but exhibited some cold flow. At higher levels of plasticizer the plasticized homopolymer became progressively more tacky and exhibited greater and greater cold flow. This example illustrates that even though the poly-t-butyl styrene is plasticized, it loses all strength. It is clear from this and the earlier examples that, in the plasticization of poly-t-butyl styrene, good properties can be achieved only when the TBS is the middle block in a 3-block copolymer and the TBS is selectively plasticized.

EXAMPLE 6

The examples above have shown specific cases where products meeting the criteria of this invention have been operable, and examples where products not meeting these criteria have been inoperable. In this example, we shall again demonstrate the importance of these criteria employing different block copolymers. A block copolymer of polystyrene and polyvinyl toluene was prepared employing the same experimental procedure as described in Example 1. A block copolymer having the center block composed of polyvinyl toluene (70 percent) and the end blocks composed of polystyrene (15 percent at each end) was prepared. This block copolymer was then plasticized with the same oil employed previously (Primol D) at levels of 60 to 140 parts per 100 of block copolymer. In this block copolymer we obtain the following values for the solubility parameter of the respective blocks and the oil plasticizer:

| Polymer | $\delta$ |
| --- | --- |
| Polystyrene | 9.1 |
| Polyvinyl toluene | 8.85 |
| Primol D | 7.3 |

Based on the criteria established for operability of our invention these plasticized products would have undesirable properties because the plasticizer would not be sufficiently compatible with the vinyl toluene block. The incorporation of Primol D plasticizer at the following levels was attempted:

| Plasticizer Level | Appearance of Plasticized Product |
| --- | --- |
| 60 | Milky, Brittle, Exudation |
| 80 | Milky, Brittle, Exudation |
| 100 | Milky, Brittle, Exudation |
| 120 | Milky, Brittle, Exudation |
| 140 | Milky, Brittle, Exudation |

Clearly, the exudation of plasticizer and undesirable products are consistent with our invention and the criteria contained therein.

EXAMPLE 7

The block copolymer of Example 6 is plasticized with 100 parts of dibutylphthalate per 100 parts of block copolymer. The resulting product is clear, tacky, and possess essentially no strength. It is clear that the plasticizer with a solubility parameter of 9.3 has plasticized both the center block ($\delta$ of 8.85) and the end blocks ($\delta$ of 9.1) to an extent which renders the resulting product useless as a flexible plastic. This example clearly demonstrates the importance of employing a block copolymer wherein the solubility parameters of the blocks are markedly different (by at least 0.7).

EXAMPLE 8

A block copolymer of polyvinyl toluene and poly-t-butylstyrene was prepared using the experimental procedure of Example 1. The center block of this three block copolymer was poly-t-butyl styrene and comprised 70 weight percent of the polymer while the end blocks constituted 15 weight percent each of polyvinyl toluene. We can represent this block copolymer at 15 VT-70TBS-15VT. The solubility parameters of the various blocks and a suitable plasticizer (Primol D) are as follows:

| Polymer Block | Solubility Parameter |
| --- | --- |
| Poly(vinyltoluene) | 8.85 |
| Poly(t-butylstyrene) | 8.1 |
| Primol D | 7.3 |

Based on the criteria we have established this block copolymer should be effectively plasticized with Primol D to provide a strong clear product with good strength. The following table demonstrates that this is indeed the case.

Plasticization of Vinyl Toluene Block Copolymers (15VT-70TBS-15VT), Plasticizer - Primol D

| Plasticizer, phr | Physical Appearance | Modulus, psi | | | | | Tensile Strength, psi | Elongation, % |
| --- | --- | --- | --- | --- | --- | --- | --- | --- |
| | | 100% | 200% | 300% | 400% | 500% | | |
| 60 | Clear | 730 | 940 | — | — | — | 1100 | 265 |
| 80 | Clear | 210 | 380 | 580 | — | — | 730 | 370 |
| 100 | Clear | 30 | 80 | 180 | 370 | 610 | 630 | 515 |
| 120 | Clear | 15 | 50 | 110 | 250 | 430 | 490 | 540 |
| 140 | Clear | 10 | 20 | 70 | 160 | 300 | 370 | 540 |

EXAMPLE 9

According to the procedures described in Example 1 a 19.7 wt. % styrene-60.6 wt. % TBS-19.7 wt. % styrene terblock copolymer was prepared. The copolymer had an overall degree of polymerization of at least 1403 and was hard and brittle. GPC showed it to be essentially 3-block and to possess a narrow molecular weight distribution.

Three low molecular weight polybutadienes with theoretical degrees of polymerization (DP) of 10, 20, and 50 were prepared using a n-butyllithium initiator in benzene solvent. These fluid polymers contain about 10 percent 1,2-addition and 90 percent 1,4-addition. The number average molecular weights were determined by vapor pressure osmometry, and kinematic viscosities were determined.

| Theor. DP | Mol. Wt. | Viscosity, Centistokes (25°C.) |
|---|---|---|
| 10 | 680 | 44 |
| 20 | 1190 | 160 |
| 50 | 3150 | 2250 |

According to the procedures described in Example 1 the copolymer was plasticized with 100 parts by weight of Primol D, Flexon 845, and each of the three low molecular weight polybutadienes described above. The plasticized products possessed the following tensile properties:

| Plasticizer | Tensile, psi | Elongation, % |
|---|---|---|
| Primol D | 900 | 445 |
| Flexon 845 | 650 | 420 |
| DP 10 PBD | 190 | 360 |
| DP 20 PBD | 470 | 440 |
| DP 40 PBD | Cloudy, stiff and crumbly | |

These data show that too low molecular weight polybutadienes plasticize both the styrene and the TBS phases whereas too high molecular weight polybutadienes are incompatible with both the styrene and TBS phases. However, polybutadienes with molecular weights between 700 and about 3000 are suitable plasticizers for styrene-TBS-styrene copolymers.

EXAMPLE 10

Three low molecular weight polyisoprenes with theoretical DP's of 10, 20, and 40 were prepared using a n-butyllithium initiator in benzene solvent. These polyisoprenes are largely 1,4-cis-addition polymers. The number average molecular weights were determined by vapor pressure osmometry, and kinematic viscosities were determined.

| Theor. DP | Mol. Wt. | Viscosity, Centistokes (25°C.) |
|---|---|---|
| 10 | 1160 | 450 |
| 20 | 1640 | 1130 |
| 40 | 2450 | 3610 |

Each of these three polyisoprenes was added to the styrene-TBS-styrene block copolymer described in Example 9 at a level of 100 parts by weight. The plasticized products possessed the following tensile properties:

| Plasticizer | Tensile, psi | Elongation, % |
|---|---|---|
| DP 10 PI | 690 | 480 |
| DP 20 PI | 740 | 460 |
| DP 40 PI | 855 | 445 |

These data show that low molecular weight polyisoprenes with molecular weights of about 3000 or less are excellent plasticizers for styrene-TBS-styrene block copolymers.

EXAMPLE 11

Into the styrene-TBS-styrene block copolymer described in Example 9 was mixed 100 parts by weight of squalane. Squalane is 2,6,10,15,19,23-hexamethyl tetramethyl tetracosane (formula weight 423) and is in structure an exactly alternating ethylene-propylene copolymer with an overall degree of polymerization of 12. The plasticized composition possessed a tensile strength of 600 psi. and an elongation of 410 percent. These data show that low molecular weight completely aliphatic oils, such as ethylene-propylene copolymers of 2000 molecular weight or less are excellent plasticizers for styrene-TBS-styrene block copolymers.

EXAMPLE 12

Into the styrene-TBS-styrene block copolymer described in Example 9 was mixed 100 parts by weight of polypropylene oil possessing a number average molecular weight of 490 and a kinematic viscosity of 30 centistokes at 25°C. The plasticized material possessed a tensile strength of 1060 psi. and an elongation of 345 percent.

These data show that saturated low molecular weight aliphatic compound, such as poly-$\alpha$-olefins with molecular weights of 2000 or less, are excellent plasticizers for styrene-TBS-styrene block copolymers.

What is claimed is:

1. Plasticized thermoplastic copolymers wherein said copolymer is selected from the group consisting of block copolymers having the general formulae (I) A—B—A, (II) A—B—A—B—A and (III) $xB - [A-B]_n - yA$, and graft copolymers having the general formula (IV)

wherein $m$ and $n$ are integers greater than or equal to 2; $x$ and $y$ are 0 or 1, and $y$ is 0 when $n$ is 2; and A and B are mutually incompatible thermoplastic polymers blocks having a solubility parameter difference of greater than 0.7, and said plasticizer is selected from the group consisting of plasticizers having a solubility parameter within 1.2 units of the solubility parameter of said B polymer block, and the solubility parameter of said plasticizer is closer to the solubility parameter of said B block than said A block.

2. The composition of claim 1 wherein said A and B polymer blocks have the molecular weight of at least 5,000.

3. The composition of claim 2 wherein A and B have a glass transition temperature of at least 35°C.

4. The composition of claim 2 wherein said composition comprises from 25 to 300 parts plasticizer per hundred parts of copolymer.

5. The composition of claim 4 wherein said copolymers are selected from the group consisting of vinyl aromatics.

6. The composition of claim 5 wherein said vinyl aromatics are selected from the group consisting of styrene, t-butylstyrene, vinyl toluene and $\alpha$-methyl styrene.

7. The composition of claim 6 wherein said B block comprises at least 30 percent by weight of the total polymer.

8. The composition of claim 7 wherein B is a polystyrene block and the plasticizer is selected from the group consisting of dibutylphthalate, dihexylphthalate and tributyl phosphate.

9. The composition of claim 7 wherein said B block is a poly-t-butylstyrene block and said plasticizer is selected from the group consisting of low molecular weight polymers of polypropylene, polybutadiene, and polyisoprene, and ethylene-propylene copolymers.

10. The composition of claim 7 wherein the homopolymeric and di-block content is less than 10 percent by weight of polymer.

11. Plasticized thermoplastic copolymers wherein said copolymer is selected from the group consisting of block copolymers having the general formula A—B—A wherein A and B are mutually incompatible thermoplastic polymer blocks having a solubility parameter difference of greater than 0.7 and said plasticizer is slected from the group consisting of plasticizers having a solubility parameter within 1.2 units of the solubility parameter of said B polymer block, and the solubility parameter of said plasticizer is closer to said B block than said A block.

12. The composition of claim 11 wherein said A and B polymer blocks have the molecular weight of at least 5,000.

13. The composition of claim 12 wherein A and B have a transition temperature of at least 35°C.

14. The composition of claim 12 wherein said composition comprises from 25 to 300 parts plasticizer per hundred parts of copolymer.

15. The composition of claim 14 wherein said copolymers are selected from the group consisting of vinyl aromatics.

16. The composition of claim 15 wherein said vinyl aromatics are selected from the group consisting of styrene, t-butylstyrene, vinyl toluene and α-methyl styrene.

17. The composition of claim 16 wherein said B block comprises at least 30 percent by weight of the total polymer.

18. The composition of claim 17 wherein B is a polystyrene block and the plasticizer is selected from the group consisting of dibutylphthalate, dihexylphthalate and tributyl phosphate.

19. The composition of claim 17 wherein said B block is a poly-t-butylstyrene block and said plasticizer is selected from the group consisting of squalane, low molecular weight polymers of polypropylene, polybutadiene, and polyisoprene.

20. The composition of claim 17 wherein the homopolymeric and di-block content is less than 10 percent by weight of polymer.

21. A plasticized thermoplastic copolymer wherein said copolymer is represented by the general formula A—B—A wherein A is styrene and B is t-butylstyrene, and said plasticizer is selected from the group consisting of plasticizers having a solubility parameter of from 6.9 to 8.5.

22. The composition of claim 21 wherein the molecular weight of the styrene and the t-butylstyrene blocks are greater than 5,000.

23. The composition of claim 22 wherein said plasticizer comprises from 25 to 300 parts per hundred parts of copolymer.

24. The composition of claim 23 wherein said t-butylstyrene block comprises at least 50 wt. %.

25. The composition of claim 24 wherein said plasticizer is a hydrocarbon oil having an aromatic content of less than 50 volume %.

26. The composition of claim 24 wherein said plasticizer is a hydrocarbon oil having an aromatic content of less than 15 volume %.

27. The composition of claim 24 wherein said plasticizer is a hydrocarbon oil having an aromatic content of less than 2 volume %.

* * * * *